United States Patent [19]

Merrick et al.

[11] 4,368,375

[45] Jan. 11, 1983

[54] WELDING TORCH OSCILLATING MECHANICAL APPARATUS

[75] Inventors: George J. Merrick, Franklin; George E. Cook, Brentwood; Donald D. Modglin, Nashville, all of Tenn.

[73] Assignee: The Merrick Corporation, Nashville, Tenn.

[21] Appl. No.: 365,043

[22] Filed: Apr. 2, 1982

Related U.S. Application Data

[60] Continuation of Ser. No. 120,049, Feb. 11, 1980, abandoned, which is a division of Ser. No. 857,359, Dec. 5, 1977, Pat. No. 4,188,525, which is a division of Ser. No. 54,975, Feb. 3, 1976, Pat. No. 4,145,593.

[51] Int. Cl.³ .............................................. B23K 9/12
[52] U.S. Cl. ............................ 219/125.12; 219/124.1; 228/27
[58] Field of Search ........... 219/125.12, 125.1, 125.11, 219/124.1, 124.22; 228/27, 28

[56] References Cited

U.S. PATENT DOCUMENTS 3,586,943  6/1971  Gonzalez ..................... 219/125.12
3,989,921  11/1976  Ohi et al. .................... 219/125.12

*Primary Examiner*—C. C. Shaw
*Attorney, Agent, or Firm*—Jones & Askew

[57] ABSTRACT

Apparatus for manipulating a welding torch independently along two axes. A torch support is provided to carry a welding torch or the like, and a motor is operatively coupled to position the torch support along a first path of travel relative to the weld joint. Another motor is operatively coupled to position the torch along a second path of travel orthogonal to the first path of travel.

6 Claims, 7 Drawing Figures

WELDING TORCH OSCILLATING MECHANICAL APPARATUS

This application is a continuation, of application Ser. No. 120,049, filed Feb. 11, 1980, now abandoned, which is a division of Ser. No. 857,359, filed Dec. 5, 1977 and now U.S. Pat. No. 4,188,525, which in turn is a division of Ser. No. 54,975 filed Feb. 3, 1976 now U.S. Pat. No. 4,145,593.

This invention relates in general to welding and in particular to off-axis welding of pipeline in which a welding torch is traversed with respect to a relatively stationary workpiece.

Transmission pipelines are frequently used to transport fluid products for substantial distances, with oil and gas transmission pipelines being but two well-known examples. Such pipelines are generally constructed of individual pipe sections that are joined together by welding, and it is important that each welded pipe joint meet the criteria necessary for safe operation of the pipeline. Not only is the detection and repair of defective joints an extremely expensive undertaking, particularly where the pipeline is buried underground or submerged beneath the sea, but the existence of a defective weld joint creates a hazard of catastrophe in the case of pipelines which carry flammable products.

The separate lengths of pipe which make up an oil or a gas transmission pipeline are typically interconnected by electric-arc welding, and many types of welding techniques are used or proposed in the art for that purpose. Perhaps the simplest welding technique is shielded metal arc welding, commonly known as "stick welding", in which one or more persons manually weld each joint using hand-held welding torches of conventional design. Since each welded joint of a typical pipeline actually consists of several separate weld segments or layers, known as "passes", manual welding techniques are time-consuming and costly in view of the large number of welded pipe joints to be welded in a pipeline extending for many miles. The relative slowness of manual and other conventional welding techniques is particularly troublesome in pipe laying operations where wages and equipment expenses provide a costly overhead which must be rationalized by maximizing the number of acceptable welds that can be produced per unit of time.

Lay-down operations for underwater pipeline typically present an extreme example of operating overhead costs, since all pipe welding and related operations must take place on a barge or other vessel with maintenance costs in addition to the costs of crew and equipment directly related to laying the pipeline. Such barges are subjected to the wave motion of the prevailing sea state, moreover, so that even relatively massive barges frequently present a moving work surface relative to the completed portion of pipeline which extends from the barge into the sea. It has been found that the pipeline cannot be rigidly clamped to the deck of the lay-down barge, since sea-induced movements of the barge can readily damage the pipeline. Such problems further complicate the task of welding sections of pipe to the completed portion of the pipeline.

Welding devices have been proposed which traverse a welding torch about the circumference of a pipe joint while welding the joint. Since it is obviously impossible to rotate the joint end of a pipeline which may extend for many miles from a laydown barge (or any other joint welding site), automatic pipe welding equipment generally traverse a welding torch circumferentially about the pipe joint. Those skilled in the art will recognize that "off-axis" welding, that is, welding applications where the welding torch departs from an upright vertical position, becomes increasingly difficult as the welding torch departs the 12 o'clock or upright position in its passage around the pipe joint. The weld puddle is subjected to natural forces including gravity, surface tension, and capillary attraction within the grooved joint being welded, and the net force acting on the puddle constantly changes as the torch traverses about the circumference of a pipe joint which is in a nonhorizontal plane. When the torch is welding at the 6 o'clock position, maximum care must be exercised to prevent the weld puddle from falling out of the weld by gravity.

It has been proposed to overcome gravitational pull-out of the weld puddle during off-axis welding by applying pulsed welding current to the torch, so that the weld puddle will slightly congeal during each "off" portion of the pulsed weld current. The operating speed of welding torches receiving pulsed welding current must be correspondingly reduced, however, and it is possible that the welds which are produced by the pulse-induced intermittent partial cooling may have undesirable metallurgical properties.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

Accordingly, it is an object of the present invention to provide an improved apparatus for welding along a predetermined path of workpieces such as pipe joints or the like.

It is another object of the present invention to provide apparatus for automatically welding pipe joints and the like, at an improved rate of metal deposition and with an improved quality of weld.

It is another object of the present invention to provide a pipeline welding system in which precise alignment of one or more welding torches can be accomplished with only rough positioning of one or more torch carriers in relation to a pipe joint being welded.

Still another object of the present invention is to provide a programmable welding system in which selected welding parameters are automatically varied in relation to welding torch position or other factors.

Stated in general terms, the present invention comprises a pipe-engaging support apparatus which positively engages two sections of pipe adjacent a common joint; a welding torch transport means which is supported by the support means, and which is movable relative to the support means for positioning in proximity to the pipe joint; and control means which controls selected operating parameters of one or more welding torches associated with the torch transport means. Stated somewhat more specifically, the torch transport means is connected to the support means for movement along several degrees of freedom relative to the support means and the pipeline sections engaged by the support means, so that welding torches associated with the torch transport means are maintained in fixed relation with the pipeline irrespective of pipeline movements relative to a barge deck or other off-pipeline work station. The torch transport means includes track sections which are parallel to the joint, and carriages which are movable along each track. Each carriage supports one or more welding torches in angular offset relation, relative to the circumference of the pipe joint to be welded. Each carriage as well as each welding torch carried by the plural carriages, is independently operable to provide preselected optimal welding parameters for the particular circumferential position of each welding torch relative to the circumferential pipe joint being welded. Automatic control of the arc length for each torch, as well as electrical adjustment of the center point of weld-joint transverse oscillation for each torch, permits the torches to independently maintain a precision track about the pipe joint irrespective of possible eccentricity of the support means and carriages with respect to the pipe joint.

The foregoing and other objects and advantages of the present invention will become more readily apparent from the disclosed preferred embodiment as described below with respect to the drawings, in which.

Figure 6A:
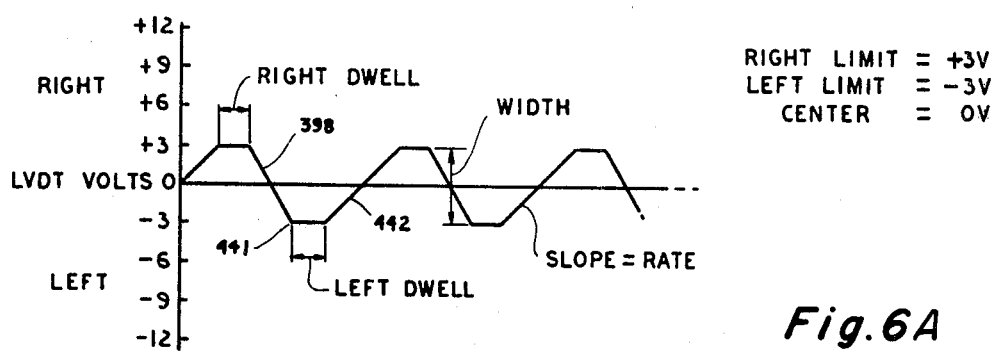
Figure 6B:
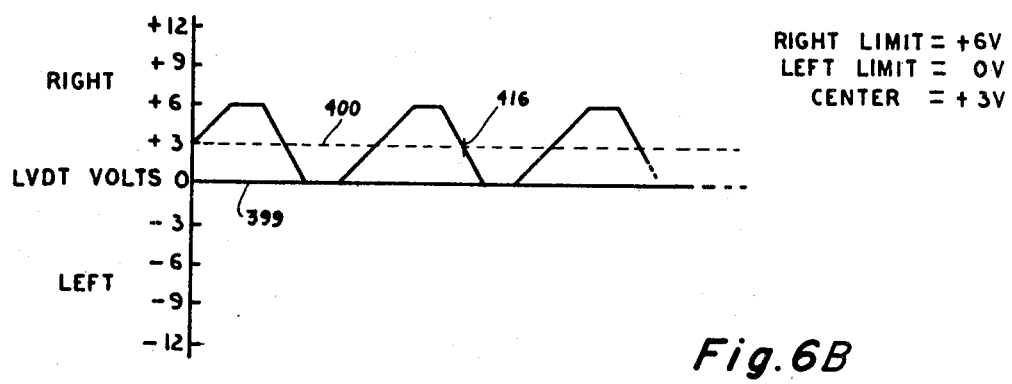

FIGS. 6A and 6B graphically depict two examples of torch oscillation control provided by the present invention;

The illustrative embodiment of the present welding torch oscillating apparatus includes a welding head assembly H1 which, in an actual embodiment of the present invention, is one of four such assemblies that are supported by a carriage which moves along a predetermined path with respect to a workpiece. Specific details of the carriage which supports the welding head assembly H1, along with associated control apparatus, are found in U.S. Pat. No. 4,145,593. The details of a typical welding head assembly H1 are shown in FIGS. 1-4. The welding head assembly is connected to the carriage or by a pair of support rods 100a, 100b which extend inwardly from the carriage and terminate in a bracket 101 to which the head assembly is secured. The head assembly H1 carries a torch support 102 on which is mounted a welding torch assembly T. The torch T has a torch base 147 which is connected to the torch support 102 by the bolt 148. The head assembly H1 is independently capable of moving the torch support 102, along with the torch assembly T, along a vertical path 103 which is vertically perpendicular to the axis of the pipe joint being welded, and along a horizontal path 104 which is horizontally perpendicular to that joint. Movement along the vertical path varies the arc spacing between the torch assembly T and the joint to be welded as the torch assembly T is moved by its supporting carriage, and the vertical path movement is operated by the automatic voltage control described in the aforementioned copending application while movement along the horizontal path 104 oscillates the torch assembly with respect to the joint.

The torch support 102 is mounted at the outer ends of a pair of rods 105a, 105b which extend outwardly from a vertically-elongated opening 106 in the front wall 107 of the welding head assembly H1. Each of the rods 105a and 105b slidably extends through corresponding openings in the front face 110a of the bearing block 110 and extends inwardly to be slidably received through mating openings in the rear face 111 of the bearing block. The bearing block is connected to the vertical travel bar 112, which is supported by the vertical shafts 113a, 113b and the corresponding ball bushings 114a, 114b for vertical reciprocating movement along the path 103. The vertical travel bar 112 has a nut 115 which engages the vertical rotary screw 116. The screw 116 is driven in either direction by the stepping servomotor 117 and the meshing gears 118. It will be understood that the vertical travel bar 112 vertically slides along walls 119a, 119b and, along with the rods 105a and 105b which carry the torch support 102, is moved up or down depending on the rotational direction of the motor 117.

The two rods 105a and 105b extend through openings in the rod clamping block 122 and are positively retained therein by the tightened clamp screw 123. The clamp block 122 slidably extends through the elongated horizontal slot 121 in the bearing block 110 between the front wall 110a and the rear wall 111, and also slidably extends through the vertical slot 124 in the horizontally oscillating travel bar 125. The vertical extent of the slot 124 is at least equivalent to the movement range of the vertical travel bar 112, so that the clamp block 122 is free to move vertically within the slot 124 as the vertical travel bar and the block 110 are moved by the motor 117.

The oscillating travel bar 125 is connected to the linear ball bushing 128 which is supported for reciprocal movement along the support shaft 129. Clamped to the ball bushing 128 at 128a for oscillation therewith is the coil 132 of a linear variable differential transformer (LVDT), which moves horizontally with respect to the LVDT core 133 as the bushing 128 moves horizontally.

Connected to the oscillating travel bar 125 is a nut 136 which engages the horizontal screw 137. The screw 137 is connected by gearing 138 to the stepping servomotor 139, so that the travel bar 125 moves along the horizontal path 104 to an extent and in a direction determined by operation of the motor 139. Clamp block 122 is carried with the travel bar 125 to slide within the horizontal slot 121 in the block 110. Since the rods 105a and 105b are secured to the clamp block 122, the torch support 102 is moved horizontally by operation of the motor 139 and the horizontal position of the torch assembly T is sensed by the output of the LVDT coil 132. It will be understood that the output of the LVDT is linearly proportional to the displacement of the coil 132 relative to the core 133, with the coil output being zero volts when centered on the core 133 and with the voltage increasing positively with horizontal movement of the coil in one direction and negatively with coil movement in the other direction.

The welding torch holder H1 receives operating signals from the oscillation control 233, and it should be understood that the oscillation control in turn receives control command signals from a suitable source of programmed and/or manual position controls such as disclosed, for example, in the aforementioned patent.

Figure 1:
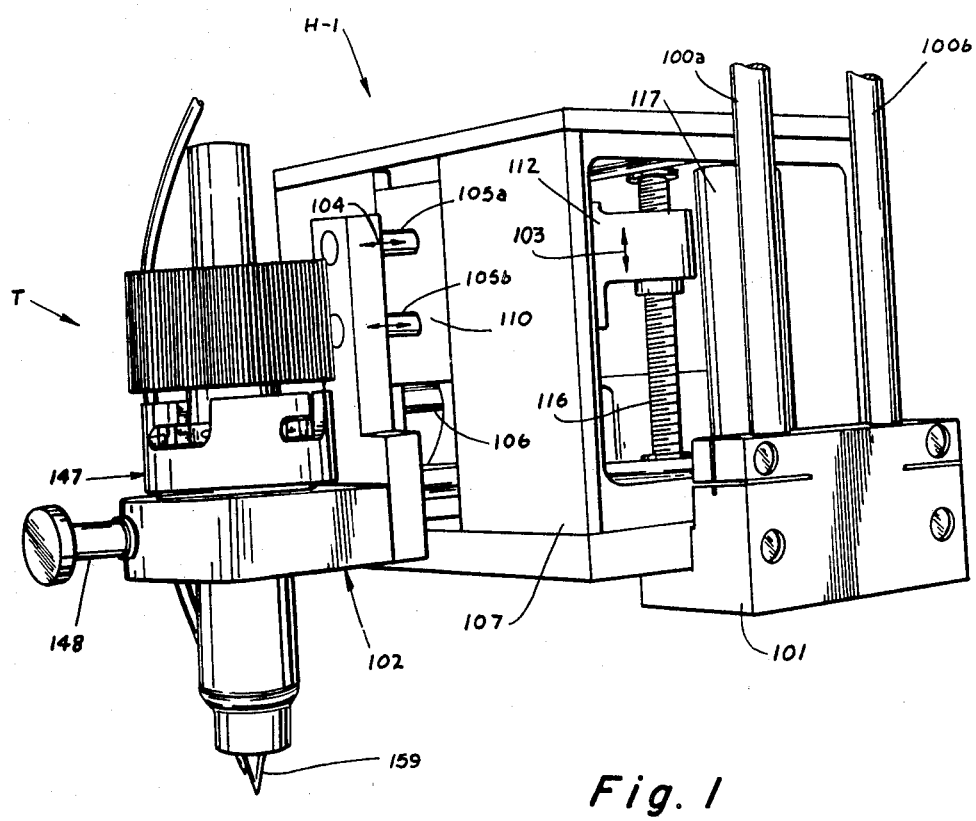
FIG. 1 is a detailed pictorial view of a welding head assembly used in the disclosed embodiment.
Figure 2:
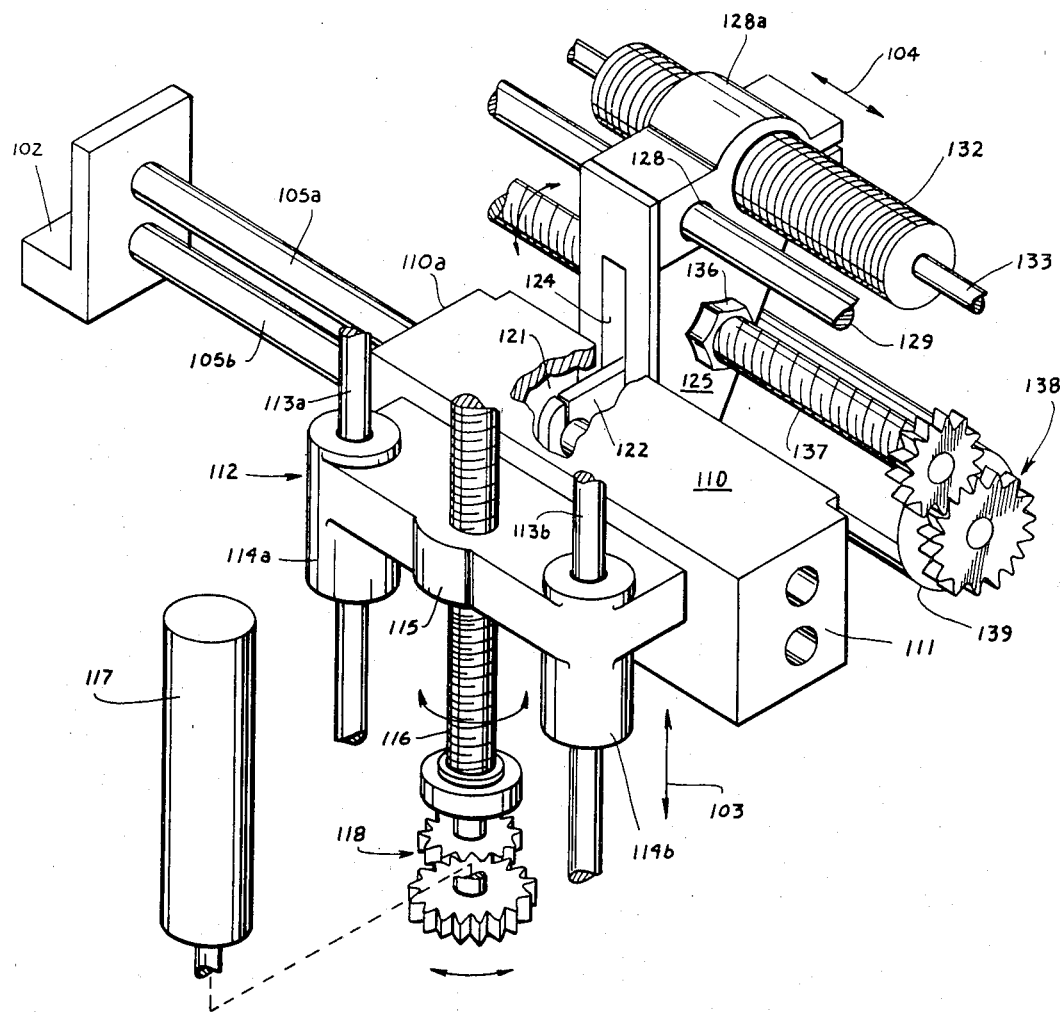
FIG. 2 is a pictorial view, partially broken away, of the mechanism which provides automatic voltage control and oscillation of one of the welding head assemblies.
Figure 3:
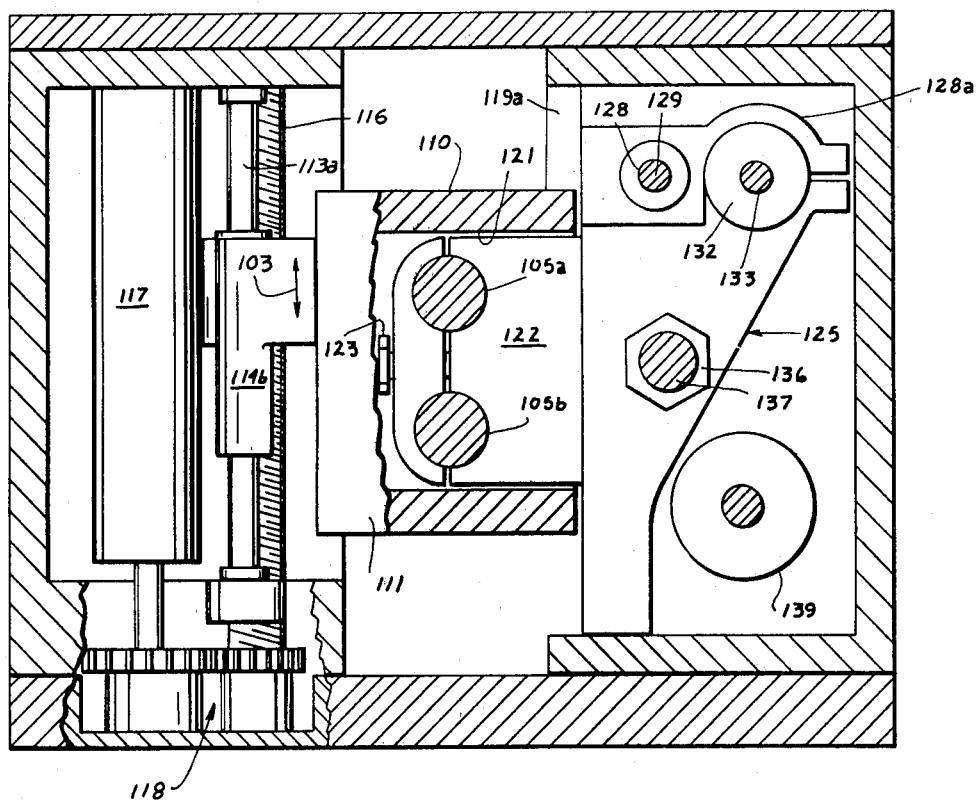
FIG. 3 is a rear elevation view of the mechanism shown in FIG. 2.
Figure 4:
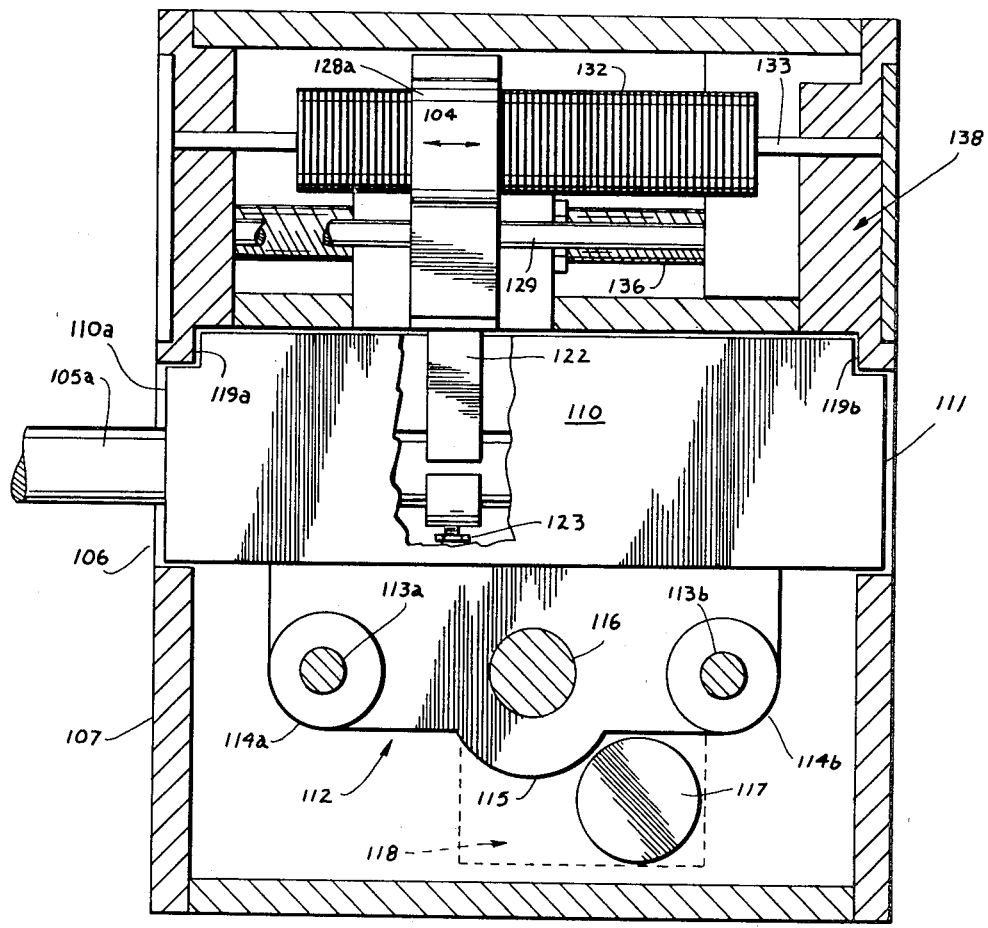
FIG. 4 is a top plan view of the mechanism shown in FIG. 2.
Figure 5:
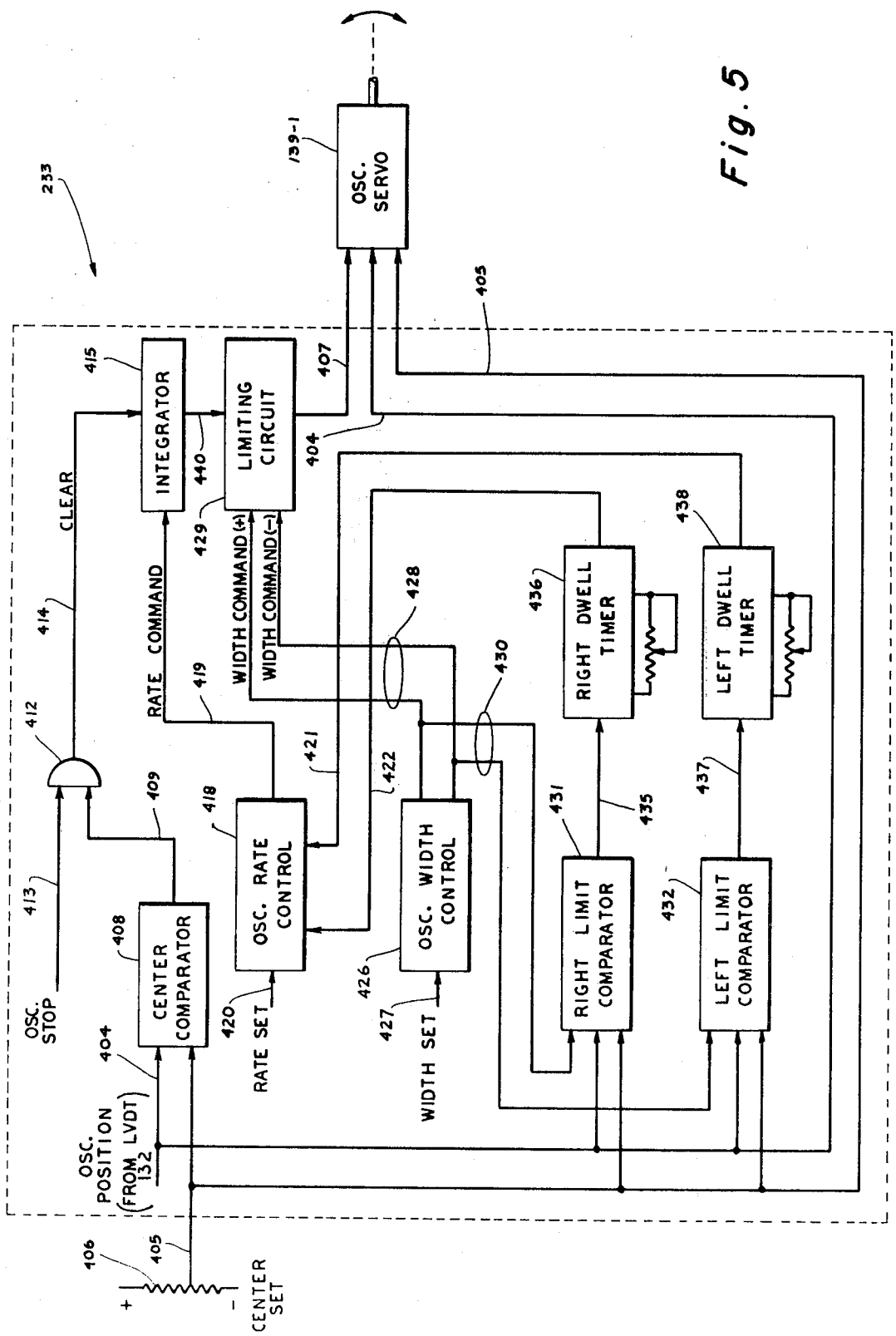
FIG. 5 is a semi-schematic block diagram of the torch oscillation control for one of the welding head control circuits of the present invention.

A block diagram of the oscillation control 233 is shown in FIG. 5, and the operation of the oscillation control is better understood by reference to the position control waveforms of FIGS. 6A and 6B. The oscillation control 233 operates the oscillator servomotor 139-1 of the related welding head assembly H1 to move the torch assembly across the pipe joint at a constant velocity, and at a rate and width of movement which are independently adjustable. The left and right limits of travel are determined electronically, without external limit switches or motion stops, and the welding head assembly is capable of remaining at the left and/or right motion limits for independently-adjustable periods of dwell time. The centerpoint of oscillation across the weld joint is adjustable, so that the torch assembly can be "centered" directly above the joint by adjusting a control such as a potentiometer or the like, before initiating a particular weld sequence.

As mentioned above, the LVDT coil 132 senses the position of the oscillating torch assembly, to provide an output voltage which is linearly proportional to the displacement of the torch assembly. The LVDT preferably provides zero volts output when the torch assembly is at the mechanical center of its maximum oscillation width, with output voltage going positive in one direction of movement from mechanical center and going negative with movement in the other direction. Referring to FIG. 6A, the zero-volt center line represents the mechanical center of oscillation, with positive-voltage departures representing horizontal movement to the right of center and with negative voltage representing movement to the left of center. Where the electrically-set center of oscillation corresponds to the mechanical center of oscillation, as illustrated in FIG. 6A, the center is represented by zero volts and the width of oscillation is represented by two signals of equal voltage and opposite polarity. Thus, the right limit is represented by 3 volts and the left limit is represented by −3 volts. The slope of the movement line 398 corresponds to the rate of horizontal movement, and the right or left limits of oscillation are determined when position voltage from the LVDT corresponds to the preset aforementioned right or left limit voltages. The right dwell and left dwell periods are denoted on FIG. 6A.

Turning next to FIG. 6B, it is there assumed that the torch assembly has been centered over a welding joint by displacement from the mechanical center, represented by the zero-volt line 399, to the 3-volt line 400 corresponding to a certain displacement to the right of mechanical center. The width of torch assembly movement shown in FIG. 6B is the same as the width in FIG. 6A, namely, horizontal movement represented by ±3 volts of LVDT movement with respect to the offset 3−volt "center line" 400.

Turning to FIG. 5, the oscillator servomotor 139-1 receives a position feedback input along the line 404 from the LVDT, a center set signal along the line 405 from a suitable source of variable voltage such as a potentiometer 406 connected across a suitable voltage source, and a position command signal on line 407. The position feedback signal on line 404 and the center set signal on line 405 are also supplied to the center comparator 408, which senses when the torch position signal on line 404 is equal to the center set signal on line 405 and provides an output signal on line 409 when such signal equality occurs. The output on line 409 is supplied to the coincidence gate 412, which may also receive an oscillation stop signal along line 413 from the a source of carriage control signals, such as disclosed in the aforementioned copending application. If the stop signal is present on the line 413 when the torch assembly moves through a "center" position corresponding to the center set potentiometer 406, the coincidence gate 412 provides a signal on line 414 to clear and hold the integrator circuit 415, as described below, thereby stopping the torch assembly at the center position determined by potentiometer 406. An example of such center signal coincidence is shown at 416 in FIG. 6B.

The rate of torch assembly oscillation is determined by the oscillation rate control circuit 418, which provides alternative rate command signals of equal voltage but opposite polarity on the line 419, as an input signal to the integrator circuit 415. The magnitude of the rate command signals provided by the rate control circuit 418 is determined by the rate set input signal on line 420, from an appropriate source, such as disclosed in the aforementioned copending application.

The polarity of the rate command signal on line 419 is controlled in flip-flop manner by signals received on the lines 421 or 422, as described below.

The oscillation width signal, as previously mentioned, is represented by two signals of equal voltage and opposite polarity, and such width signals are provided by the oscillator width control circuit 426. The width signal, the amplitude of which is determined by the input on the line 427 from an appropriate source, is supplied along the lines 428 as a width command signal to the limiting circuit 429, and along the lines 430 to provide an input to the right limit comparator 431 and the left limit comparator 432. Each of the right and left limit comparators also receive the oscillator position input signal from line 404, and the center set signal from line 405.

The right limit comparator 431 compares the oscillator position signal with a limit signal which is equivalent to the sum of the width signal (from the width control circuit 426) and the center set signal. The right limit comparator 431 provides an output signal on line 435 to the right dwell timer 436 when the oscillator position signal becomes equal to the sum of the center set signal and the positive-polarity width signal, while the left limit comparator 432 similarly provides an output signal on the line 437 to the left dwell timer 438 when the oscillator position signal reaches the sum of the center set signal and the negative-polarity width signal. Each of the right and left dwell timers 436 and 438 provides an output signal, an adjustable predetermined time after receiving an input signal from the corresponding limit comparator, along the respective lines 422 and 421 to the rate control circuit 418. The polarity of the rate command signal is reversed whenever the rate control circuit 418 receives a signal from either dwell timer.

Considering the operation of the oscillation circuit 233 shown in FIG. 5, it will be understood that the fixed-amplitude rate command signal on line 419 is integrated by the integrator circuit 415 (absent a stop signal on line 413) so that a linear ramp signal is present on line 440 from the integrator circuit. The ramp signal is applied through the limiting circuit 429 to the oscillation servomotor 139-1 to operate the servomotor at a constant speed for traversing the torch assembly across the pipe joint. The slope of the ramp signal on the line 440, and therefore the rate of oscillation, is represented by the movement line 398 on FIG. 6A, for example.

The limiting circuit 429 clamps the ramp output signal of the integrator circuit 415 to the positive and negative width command voltages which are alternatively present on the lines 428. Referring again to FIG. 6A, when the ramp voltage reaches the −3 volt left limit width command signal, the limiting circuit 429 clamps the ramp voltage to that level as shown at 441, and the oscillation servomotor 139-1 stops to maintain the torch assembly at the left limit of oscillation. Attainment of this left-limit condition is also sensed by the left limit comparator 432, which activates the left dwell timer 438. When the left dwell timer has timed out, the polarity of the rate command signal applied on line 419 from rate control circuit 418 is reversed, and the integrator circuit 415 commences producing a ramp signal 442 (FIG. 6A) of opposite slope relative to the ramp 398. The oscillation servomotor 139-1 thus commences to move the torch assembly back across the joint toward the right limit, which is determined by the positive-polarity width command signal and the limiting circuit in a similar manner. The torch assembly continues to oscillate in the foregoing manner until an appropriate oscillation stop signal is applied along line 413 followed by occurrence of a sensed center signal along the line 409, whereupon a signal is applied along line 414 to interrupt operation of the integrator circuit 415 at a time when the torch assembly is at the center set position determined by the potentiometer 406.

It should be understood that the disclosed use of the present invention to weld a vertical-plane joint about horizontal pipe is by way of example only, since the present invention is readily adaptable for automatic welding along any path in response to preprogrammed weld parameters chosen for the weld path.

It will be understood that the foregoing relates only to a preferred embodiment of the present invention, and that numerous changes and modifications may be made therein without departing from the spirit and the scope of the invention as set forth in the following claims.

We claim:

1. Apparatus for positioning a welding torch in two axes with respect to a weld path, comprising:
   mounting means supported in predetermined relation to the weld path;
   first movable means carried by said mounting means and supported for movement along a first axis;
   first motive means comprising a stationary portion supported in fixed relation to said first movable means and a second portion selectably operative to position said first movable means along said first axis;
   second movable means carried by said first movable means and supported for movement relative to said first movable means along a second axis;
   second motive means comprising a stationary portion supported in fixed relation to said first movable means and said second means and a second portion operative to selectably position said second movable means along said second axis independently of the position of said first movable means along said first axis; and
   welding torch support means carried by said second movable means for movement along either of said axes relative to the weld path, whereby the mass of the stationary portion of each motive means is excluded from the mass being positioned by the motive means.

2. Apparatus as in claim 1, wherein said first and second paths are transverse to each other, and are at transverse attitudes relative to the longitudinal extent of the weld path.

3. Apparatus as in claim 2, wherein:
   said mounting means comprises a housing;
   said first movable means comprises a bearing block supported for reciprocal movement along said first path within said housing;
   said second movable means is supported by said bearing block for reciprocal movement along said second path;
   said second motive means is positioned within said housing adjacent said bearing block for selective movement along said second path; and
   means operatively interconnecting said second motive means with said second movable means to couple said movement along said second path only.

4. Apparatus as in claim 3, further comprising position sensor means positioned within said housing and operative to provide a position signal which corresponds to the position of said second movable means on said second path.

5. Apparatus for positioning a welding torch in two axes with respect to a weld path, comprising:
   mounting means supported in predetermined relation to the weld path;
   first movable means supported by said mounting means for movement along a first axis relative to the weld path;
   a first motor supported by said mounting means in fixed relation to said mounting means;
   first interconnecting means supported by said mounting means and operatively interconnected between said first motor and said first movable means to move said first movable means along said first axis;
   second movable means supported by said first movable means for movement relative to said first movable means along a second axis relative to the weld path;
   a second motor supported by said mounting means in fixed relation to said mounting means;
   second interconnecting means supported by said mounting means and operatively interconnecting said second motor to said second movable means to selectably position said second movable means along said second axis independently of the position of said first movable means along said first axis; and
   welding torch support means carried by said second movable means for movement along either of said axes relative to the weld path,
   so that said first and second motors remain stationary relative to said mounting means as said torch support means is moved along each axis.

6. Apparatus as in claim 5, wherein said second interconnecting means comprises:

a member operatively connected to said second motor for selective movement along a path parallel to said second axis; and means providing a lost-motion interconnection between said member and said second movable means along a path parallel to said first axis, so that said first movable means can move said second movable means and said torch support means along said first axis without interference from said fixed second motor.

* * * * *